United States Patent Office 2,710,882
Patented June 14, 1955

2,710,882

PREPARATION OF VINYL SULFONAMIDE

Harold F. Park, East Longmeadow, and Raymond I. Longley, Jr., Springfield, Mass., assignors to Monsanto Chemical Company, St. Louis, Mo., a corporation of Delaware No Drawing. Application July 20, 1953, Serial No. 369,251

8 Claims. (Cl. 260—556)

This invention relates to the process for the preparation of vinyl sulfonamide. More particularly, this invention relates to a process for the preparation of vinyl sulfonamide from ethylene sulfonyl chloride.

Vinyl sulfonamide can be used to prepare polymers and copolymers that are suitable for many purposes including the preparation of synthetic fibers, molding powders, soil additives, adhesives, coatings, etc. However, vinyl sulfonamide contains both a reactive vinyl group and a reactive amino group and, as a result, special problems are encountered in its preparation.

Alkyl sulfonamides can be prepared by reacting an alkyl sulfonyl chloride with ammonia under anhydrous conditions. However, when it is attempted to prepare vinyl sulfonamide by this process, the product is usually anhydrotaurine, a cyclic compound having the structural formula

Thus, Kohler (American Chemical Journal, vol. 19, page 744, 1897) reports that when ammonia is passed into a solution of 1,2-ethane disulfonyl chloride, the product is anhydrotaurine, a water-soluble, alcohol-insoluble crystalline compound melting at a temperature of 88° C. Clutterbuck and Cohen (Journal of the Chemical Society, vol. 121, page 125, 1922) reported the reaction of dry ammonia with disulfonyl chloride in solution in dry ether, the product being a water-soluble, alcohol-insoluble crystalline material melting at 87° C. The authors felt that the product might be vinyl sulfonamide, but the material which they obtained corresponds to the anhydrotaurine reported by Kohler.

Ethylene sulfonyl chloride is an easily prepared material which theoretically could be used as a raw material for the preparation of vinyl sulfonamide. However, when reacted with ammonia, substantially all of the ethylene sulfonyl chloride is converted to anhydrotaurine. From this, it is seen that vinyl sulfonamide cannot be prepared by the same process that is normally used to prepare alkyl sulfonamides.

Accordingly, an object of the present invention is the provision of a process for the preparation of vinyl sulfonamide.

Another object is the provision of a process for the preparation of vinyl sulfonamide from ethylene sulfonyl chloride.

A further object is the provision of a process for the preparation of vinyl sulfonamide in good yield from ethylene sulfonyl chloride.

These and other objects are attained by reacting ethylene sulfonyl chloride in aqueous dispersion at a temperature of from 0° C. to 100° C. with an ammonium salt having a pH of from 5.0 to 10.0 in 10% aqueous solution.

The following examples are given in illustration and are not intended as limitations on the scope of this invention. Where parts are mentioned, they are parts by weight.

Example I

Dissolve 40 parts of ammonium chloride in 300 parts of water and while agitating the solution, add thereto 100 parts of ethylene sulfonyl chloride. With continued agitation, cool the mixture in an ice-water bath and then slowly add a solution of 110 parts of disodium phosphate in 800 parts of water while maintaining the temperature of the reaction mixture between 15° C. and 30° C., the rate of addition of the disodium phosphate solution being such that the pH of the mixture is maintained between 6.5 and 7.5. Continue agitation for about 30 minutes after all of the disodium phosphate solution has been added. Remove the water by vacuum distillation at room temperature in order to obtain a solid residue. Add anhydrous ethanol to the dried residue, filter and evaporate the filtrate. The product recovered from the filtrate on evaporation of the ethanol consists of about 70 parts of vinyl sulfonamide (approximately 80% of theoretical yield). When a sample of the vinyl sulfonamide is subjected to analysis in an infra-red spectrophotometer, the spectra indicate the presence of amino groups and vinyl groups, thus showing the product to be vinyl sulfonamide, $CH_2=CHSO_2NH_2$. The vinyl sulfonamide prepared in this manner does not have a sharp melting point, the softening point being dependent on the rate at which it is heated. If the vinyl sulfonamide is slowly heated, it melts at about 170° C. and careful continued heating will polymerize it to a solid condition at about 180° C. If heated rapidly, it will melt at a temperature of about 120° C.

Example II

While agitating 400 parts of water at 0° C., disperse therein 100 parts of ethylene sulfonyl chloride. With continued agitation, slowly add a solution of 75 parts of ammonium carbonate in 150 parts of water at a rate such that the pH is maintained at about 7.0; the temperature being held to less than 20° C. by external cooling. After the last of the ammonium carbonate solution has been added, continue agitation for an additional 30 minutes. At the end of this time, remove the water by vacuum distillation at room temperature to obtain a dry solid residue. Add anhydrous ethanol to the residue, filter, and evaporate the filtrate in order to obtain vinyl sulfonamide. The yield is about 75 parts of vinyl sulfonamide (approximately 85% of theoretical). The vinyl sulfonamide prepared in this fashion has the properties of the vinyl sulfonamide prepared in accordance with the procedure of Example I.

Vinyl sulfonamide is prepared in accordance with the present invention by adding an ammonium salt to an aqueous dispersion of ethylene sulfonyl chloride. Ethylene sulfonyl chloride is sparingly soluble in water and, therefore, continuous agitation should be used during the reaction in order to keep the undissolved ethylene sulfonyl chloride in suspension. Vinyl sulfonamide is soluble in water and is recovered at the end of the reaction by distilling off the water. For this reason, it is preferable to use as little water as possible. However, for ease in controlling the reaction, at least equal parts by weight of water and ethylene sulfonyl chloride should be used. It is preferable to use even more water, adding the ethylene sulfonyl chloride to from 2 to 4 times its weight of water.

In conducting the reaction, the ammonium salt should be added to the dispersion at a rate such that the pH of the resultant mixture is maintained within the range of from 5.0 to 10.0. Outside this range, substantially none of the ethylene sulfonyl chloride is converted to vinyl sulfonamide. In order to obtain the best yield, the reaction should be conducted at a pH of from 6.5 to 7.5.

Temperature has an important bearing on yield. Although any temperature of from 0° C. to 100° C. may be used, a yield in excess of 50% is generally obtained at a temperature of 30° C. or less. As a general rule, the yield increases as the temperature decreases. However, reaction rate is increased as the temperature is increased and it is preferable to use a temperature of at least 15° C. in order to obtain a reasonable reaction rate.

The ammonium salt may be added directly to the dispersion of ethylene sulfonyl chloride provided that the rate of addition is such that the pH is maintained within the desired range and further provided that localized zones of excessive pH are not formed as the salt dissolves. It is preferable to substantially completely dissolve the salt in water and to add the salt solution to the dispersion. When this is done, pH and reaction temperature are much more easily controlled. The pH of the salt solution is not critical in the sense that it must be accurately controlled. However, the concentration of the salt solution and the rate at which it is added to the dispersion should be such that a reaction pH of from 5.0 to 10.0 is maintained during the addition to the dispersion. If the salt solution is of too great a concentration, localized zones of excessive pH may be formed as the solution is added to the dispersion. If it appears that such is the case, additional water should be added to the salt solution or the rate of agitation should be increased.

The ammonium salts to be used in accordance with the present invention may be organic or inorganic. As a general rule, the operable salts will have a pH of from about 5 to 10 in 10% aqueous solution. Among the salts that may be used alone or in admixture are ammonium chloride, ammonium carbonate, ammonium acetate, ammonium sulfate, ammonium benzoate, ammonium cyanide, ammonium formate, ammonium iodide, ammonium lactate, ammonium nitrate, ammonium phosphate, etc. Nearly all of the ammonium salts to be used in accordance with the present invention will not provide a pH in excess of about 6.5 in 10% aqueous solution and it is therefore preferable to use such salts in conjunction with a suitable basic buffer as in the case of Example I. The basic buffer should preferably be used in an amount sufficient to raise the pH of the dispersion above 6.5, but not so great as to raise the pH above 7.5. Any conventional non-reactive basic buffer may be used for this purpose. Among the basic buffers that may be used alone or in admixture are sodium formate, sodium acetate, potassium benzoate, sodium borate, potassium silicate, calcium carbonate, rubidium phosphate, tetrasodium pyrophosphate, tripotassium citrate, sodium carbonate, sodium bicarbonate, disodium phosphate, etc. However, if the ammonium salt has a pH in excess of about 6.5 in 10% solution, as in the case of the ammonium carbonate used in Example II, it is not necessary to use a buffer.

The ethylene sulfonyl chloride which forms the starting material for the present invention is a well-known compound that can be prepared by a variety of known processes such as the process described by Landau (Journal American Chemical Society, vol. 69, page 1219, 1947) wherein powdered phosphorous pentachloride is reacted with ammonium ethylene sulfonate in solution in chloroform.

What is claimed is:

1. A process for the preparation of vinyl sulfonamide which comprises dispersing ethylene sulfonyl chloride in at least an equal weight of water with agitation and adding thereto an aqueous solution of an ammonium salt, the anion of said salt being non-reactive with the ethylene sulfonyl chloride, said aqueous solution being added in a manner such that the pH of the resultant mixture is maintained within the range of from 5.0 to 10.0, the temperature being maintained at from 0° C. to 100° C., said ammonium salt having a pH of about 5–10 in a 10% aqueous solution.

2. A process as in claim 1 wherein the aqueous dispersion is maintained at a temperature of from 15° C. to 30° C. and the aqueous solution is added to the dispersion at a rate such that the pH of the resultant mixture is maintained within the pH range of from 6.5 to 7.5.

3. A process as in claim 2 wherein the ammonium salt is an ammonium salt having a pH in excess of about 6.5 in 10% aqueous solution.

4. A process as in claim 3 wherein the salt is ammonium carbonate.

5. A process as in claim 2 wherein the ammonium salt has a pH of less than about 6.5 in 10% aqueous solution and wherein a basic non-reactive buffer is added to the aqueous dispersion in an amount sufficient to maintain the pH of the resultant mixture within the pH range of from 6.5 to 7.5.

6. A process as in claim 5 wherein the salt is ammonium chloride and the buffer is disodium phosphate.

7. A process for the preparation of vinyl sulfonamide which comprises reacting ethylene sulfonyl chloride in aqueous dispersion with an ammonium salt having a pH of about 5–6.5 in a 10% aqueous solution, the anion of said salt being non-reactive with the ethylene sulfonyl chloride, said reaction being conducted at a temperature of from 0 to 100° C. in the presence of a basic non-reactive buffer present in an amount sufficient to provide a pH of from 6.5 to 7.5.

8. A process as in claim 7 wherein the ammonium salt is ammonium chloride and the basic buffer is disodium phosphate.

References Cited in the file of this patent

UNITED STATES PATENTS 2,580,351    Grassie _____ Dec. 25, 1951

FOREIGN PATENTS 832,149    Germany _____ Feb. 21, 1952

OTHER REFERENCES

Truce et al.: J. Am. Chem. Soc., vol. 70, pp. 3851–2 (1948).

Terenter et al.: Chem. Abstracts, vol. 45, col. 2892–3 (1951).